United States Patent
Cox et al.

(10) Patent No.: US 10,005,443 B1
(45) Date of Patent: Jun. 26, 2018

(54) BRAKE LINE ANCHOR

(71) Applicant: TeraFlex, Inc., West Jordan, UT (US)

(72) Inventors: Christopher Paul Cox, West Jordan, UT (US); Bryce Aaron Calvin, West Jordan, UT (US)

(73) Assignee: TERAFLEX, INC., West Jordan City, UT (US)

( * ) Notice: Subject to any disclaimer, the term of this patent is extended or adjusted under 35 U.S.C. 154(b) by 0 days. days.

(21) Appl. No.: 15/486,175

(22) Filed: Apr. 12, 2017

(51) Int. Cl.
| | |
|---|---|
| B60T 17/04 | (2006.01) |
| F16L 3/18 | (2006.01) |
| F16L 3/137 | (2006.01) |
| F16L 3/10 | (2006.01) |
| F16L 3/13 | (2006.01) |

(52) U.S. Cl.
CPC .............. B60T 17/046 (2013.01); F16L 3/10 (2013.01); F16L 3/13 (2013.01); F16L 3/137 (2013.01); F16L 3/18 (2013.01)

(58) Field of Classification Search
CPC ..... F16L 3/10; F16L 3/13; F16L 3/137; F16L 3/18
USPC .......................................... 248/629
See application file for complete search history.

(56) References Cited

U.S. PATENT DOCUMENTS

| | | | | |
|---|---|---|---|---|
| 4,131,258 A | * | 12/1978 | Okuda | F16B 21/02 24/339 |
| 4,728,068 A | * | 3/1988 | Rivkin | F16B 21/088 24/297 |
| 5,190,251 A | | 3/1993 | Bodo | |
| 5,248,119 A | * | 9/1993 | Imura | F16L 3/1226 248/300 |
| 5,547,152 A | * | 8/1996 | Krock | F16L 3/1008 24/274 WB |

(Continued)

FOREIGN PATENT DOCUMENTS

| | | |
|---|---|---|
| EP | 1 323 969 A2 | 7/2003 |
| EP | 1 521 025 A2 | 4/2005 |

(Continued)

OTHER PUBLICATIONS

Brake Pipe Clips, Car Builder Solution, n.d., <http://www.carbuildersolutions.com/uk/brake-system-parts-brake-pipe-clips> [retrieved Sep. 14, 2016], 8 pages.

(Continued)

*Primary Examiner* — Anita M King
(74) *Attorney, Agent, or Firm* — Christensen O'Connor Johnson Kindness PLLC (57) ABSTRACT

Generally described, aspects of the disclosed subject matter are directed to an apparatus for anchoring a line, such as a line anchor suitable for use with the brake line of a vehicle. The brake line anchor includes a line coupling member to secure the brake line to the brake line anchor, and a mounting member for mounting the brake line anchor to the vehicle. The brake line anchor has a deflection control portion positioned intermediately along the length. The deflection control portion has a necked-down cross-sectional area such that the brake line anchor is configured to provide independent selection of the stiffness in each direction of bending and in axial compression/extension of the line coupling member such that the brake line anchor can be tailored to the mounting location and system in which the brake line anchor is utilized.

22 Claims, 5 Drawing Sheets

(56) References Cited

U.S. PATENT DOCUMENTS

| | | | |
|---|---|---|---|
| 5,806,819 A * | 9/1998 | Martone | F16B 2/10 |
| | | | 24/16 PB |
| 5,957,415 A | 9/1999 | Perea | |
| 6,752,426 B2 | 6/2004 | Kacines et al. | |
| 7,278,190 B2 | 10/2007 | Fischer et al. | |
| 7,404,548 B2 * | 7/2008 | Kwilosz | B60R 16/0215 |
| | | | 248/71 |
| 7,448,579 B2 | 11/2008 | Kwilosz et al. | |
| 7,712,708 B2 | 5/2010 | Clark | |
| 8,066,250 B2 * | 11/2011 | Vukadin | F16B 21/088 |
| | | | 248/562 |
| 8,533,919 B2 * | 9/2013 | Schliessner | F16B 5/0685 |
| | | | 24/297 |
| 8,870,132 B2 * | 10/2014 | Sampson | F16L 3/123 |
| | | | 248/62 |
| 9,383,041 B2 | 7/2016 | Kanie | |
| 2005/0242253 A1 | 11/2005 | McClure et al. | |
| 2009/0194185 A1 | 8/2009 | Holt et al. | |
| 2013/0200247 A1 | 8/2013 | Miki | |
| 2016/0123502 A1 | 5/2016 | Maki | |

FOREIGN PATENT DOCUMENTS

| | | |
|---|---|---|
| FR | 3 028 593 A | 5/2016 |
| WO | 2015/189105 A1 | 12/2015 |

OTHER PUBLICATIONS

Brake Line Clips, Merlin Motorsport, © 2016 Merlin Mailorder Ltd., <https://www.merlinmotorsport.co.uk/s/brake-clutch-parts/brake-line-clips> [retrieved Sep. 14, 2016], 4 pages.

ATV Brake Line Clamps, American Star, n.d., <http://www.amstarmanufacturing.com/BilletParts.html> [retrieved Sep. 14, 2016], 2 pages.

* cited by examiner

BRAKE LINE ANCHOR

BACKGROUND

Hydraulic, pneumatic, cable, and other lines are generally used to control various functions of many types of machinery. Typically, hydraulic, pneumatic, and cable lines facilitate the transfer of motion from a control device to a remote auxiliary device through hydraulic or gas pressure transfer, or through cable translation.

In some instances, hydraulic, pneumatic, and cable lines are used to control various systems of a vehicle from a central location, such as systems controlling the brakes, clutches, steering, central locking, throttle, exhaust valves, and other systems suitable for control by lines. In these systems, an operator or a central control system initiates the transfer of motion to the auxiliary device for remote control of the device. In the example of a hydraulic braking system of a vehicle, the operator or the central control system actuates a piston within a cylinder to transfer motion to the brake calipers using pressure of the hydraulic fluid within a brake line. Changes in the pressure of the hydraulic fluid within the brake line cause the brake caliper to actuate or release, thereby indirectly controlling the velocity of the vehicle.

To avoid failure of the hydraulic, pneumatic, or cable lines, the mounting and routing of the lines are typically implemented to avoid sharp bends; prevent pinching, puncture, or abrasion; and securely route the lines from the control device to the auxiliary device. Anchors, standoffs, and other mounting devices are generally used to secure the routed lines. The aforementioned mounting design considerations are particularly critical when the line is used between two components with relative motion. In this regard, the line may flex and move as a result of the motion between the two components. In the example of a hydraulic brake line on a vehicle, proper mounting of the line near the brake caliper prevents failure of the line as it flexes and travels with the brake caliper in relation to the vehicle frame during suspension articulation. In these mounting schemes, the use of a rigid anchor on the brake line can impart undue stress and strain to the brake line during movement, leading to premature failure of the line, potentially resulting in loss of vehicle control.

Therefore, a need exists for an improved line anchor that provides protection and extends the functional life of the line. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a line anchor is provided. The line anchor generally includes a mounting member having a mounting aperture near a proximal end of the line anchor and a fastening portion opposite the mounting aperture; and an elongate coupling member coupled to the fastening portion of the mounting member. The elongate coupling member generally includes a line securing channel extending through a distal end of the line anchor, the line securing channel defining an axis and being configured to at least partially surround a line for removably coupling the line to the line anchor; and a deflection control portion positioned intermediately along the length of the elongate coupling member, the deflection control portion having a reduced cross-sectional area and a first bending stiffness controlled by a first thickness through which the line securing channel deflects in a direction of the axis.

In accordance with another embodiment of the present disclosure, a brake line anchor for removably coupling a brake line to a vehicle is provided. The brake line anchor generally includes a vehicle mounting member comprising a mounting aperture, the mounting aperture being configured to secure a proximal end of the brake line anchor to the vehicle; and an elongate coupling member coupled to a portion of the vehicle mounting member. The elongate coupling member generally includes a brake line securing channel near a distal end of the brake line anchor, the brake line securing channel defining an axis and being configured to at least partially surround the brake line for removably coupling the brake line to the brake line anchor; and a deflection control portion positioned intermediately along the length of the elongate coupling member, the deflection control portion having a reduced cross-sectional area and a first bending stiffness controlled by a first thickness through which the line securing channel deflects in a direction of the axis, and a second bending stiffness controlled by a second thickness through which the line securing channel deflects in a direction orthogonal to the axis, wherein the first bending stiffness may be less than the second bending stiffness.

In accordance with any of the embodiments described herein, the deflection control portion may further include a second bending stiffness controlled by a second thickness through which the line securing channel deflects in a direction orthogonal to the axis.

In accordance with any of the embodiments described herein, the first bending stiffness may be less than the second bending stiffness.

In accordance with any of the embodiments described herein, the deflection control portion may further include a cross-sectional area to control deflection of the elongate coupling member along a longitudinal direction of the elongate coupling member, and wherein the deflection stiffness of the deflection control portion of the elongate coupling member in the longitudinal direction may be greater than the second bending stiffness.

In accordance with any of the embodiments described herein, the elongate coupling member may further include a securement aperture and a securement trough at the distal end for removably coupling the line within the line securing channel.

In accordance with any of the embodiments described herein, the line may be removably coupled to the line securing channel using a tie looped through the securement aperture and routed within the securement trough, the tie selected from the group consisting of a cable tie, a wire, a clamp, tape, a clip, or a combination thereof.

In accordance with any of the embodiments described herein, the elongate coupling member may be sized and configured to surround the mounting member such that the material of the elongate coupling member engages the fastening portion of the mounting member to couple the elongate coupling member thereto.

In accordance with any of the embodiments described herein, the fastening portion may include a plurality of apertures through which the material of the elongate coupling member extends to create a mechanical attachment.

In accordance with any of the embodiments described herein, the elongate coupling member may comprise a material selected from the group consisting of natural rubber, synthetic rubber, ethylene propylene diene monomer (EPDM), polymer, and polyurethane.

In accordance with any of the embodiments described herein, the mounting member may comprise a material selected from the group consisting of steel, stainless steel, aluminum, ferrous metal, non-ferrous metal, composite, laminate, and polymer.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

The following description provides several examples that relate to line anchors. Embodiments of the present disclosure are generally directed to line anchors for general use with hydraulic, pneumatic, and cable lines, such as lines used in a vehicle, and in some embodiments, the braking systems of vehicles. Embodiments of the line anchor disclosed herein are suitable to mount the lines to other components of the vehicle to assist in routing of the lines and provide protection to the lines. However, other embodiments of the line anchor disclosed herein are suitable for use in any installation where line mounting and routing are desired. Embodiments disclosed herein use symmetry, where applicable, for clarity and convenience; however, the use of symmetry (e.g., left to right, front and rear, and/or top and bottom, etc.) should not be construed as limiting the scope of the disclosure to symmetric parts, as the present disclosure also contemplates "handed" parts in locations where symmetric parts are illustrated and described.

A line anchor generally includes a mounting end, for mounting the line anchor to a component, and a line capturing end for coupling the line anchor to the hydraulic, pneumatic, cable, or to any other suitable line. The present disclosure is directed to a line anchor including features for independent selection of stiffness of the line anchor in each direction of bending and in axial compression/extension. In some embodiments, the line anchor is configured to accommodate an amount of movement of the line during relative motion of components between which the line is mounted to impart reduced stress and strain to the line. In the following discussion, the line anchor is generally described as being utilized in conjunction with the braking system of a vehicle, particularly in securement of the hydraulic brake lines of the vehicle. However, in other embodiments, the line anchor disclosed herein is suitably used in any line anchoring configuration, such as with other vehicles, or in boats, machines, equipment, and the like.

In some configurations, the line anchor is used with a brake line between the brake caliper and the body of the vehicle. Due to articulation of the suspension, the brake line flexes and moves relative to the body of the vehicle and the brake caliper. During some suspension travel events, the brake line can experience a large deflection, leading to increased stress, strain, and fatigue in relation to typical suspension travel of a vehicle. In certain instances, a deflection can also cause the brake line to move into contact with other components of the vehicle, leading to abrasion of the brake line, or into components that can crush or shear the brake line, leading to failure of the braking system. Embodiments of the present disclosure are generally directed to improving the reliability of the braking system by limiting the potential failures of the brake line due to abrasion, bending, pinching, or fatigue during excessive movement, contact with other components, or crushing of the brake line.

The aforementioned failures are particularly common in an off-road environment where obstacles and debris can contact the brake system, or where the suspension articulation is greater than in on-road driving situations. Other improvements include reducing manufacturing and part costs, lowering the weight of the system, and providing a streamlined installation for increased mounting options, among other improvements and benefits.

The following discussion provides examples of apparatuses of a brake line anchor suitable for use in routing and mounting of hydraulic, pneumatic, and cable brake lines to vehicles. The brake line anchor couples the brake line to the vehicle such that the brake line is protected from contact with other components of the vehicle. In use, the brake line anchor allows an amount of movement, skewing, twisting, or displacement of the brake line during suspension articulation to reduce stress and strain experienced by the brake line during movement.

Referring to the FIGURES, an exemplary embodiment of a brake line anchor 100 suitable for use with the braking system of a vehicle is depicted. The brake line anchor 100 is shown with mounting features for installation of the brake line anchor 100 to a mounting point (not shown) on a vehicle and to the brake line (not shown). In one example, one end of the brake line anchor 100 is suitably mounted to the frame, unibody, steering component, suspension component, braking component, or the like. Brake line anchors of the type described in the embodiments of the present disclosure are suitable for a variety of mounting configurations, and may be used with any other system of the vehicle or other machine without departing from the scope of the present disclosure.

Using the embodiments of the present disclosure, vehicles with relatively long or active suspension travel and articulation, such as driving off-road or during the turning of the wheel while the suspension is in articulation, can avoid abrasion, bending, pinching, or shearing of the brake line, reducing the tendency for the brake line to fail. As will be described in greater detail below, the brake line anchor 100 is capable of independent selection of stiffness in each direction of bending and in axial compression/extension such that the brake line anchor 100 is tailored to accommodate deflection of the brake line commensurate to the relative movement of the components while maintaining clearance of the brake line necessary to avoid contact failure. Although the brake line anchor 100 and other exemplary embodiments are described as being used with the braking system of a vehicle, it should be appreciated that the embodiments may be used in any suitable system where mounting and routing of a line is desired.

Referring to FIGS. 1-8, the brake line anchor 100 will now be described in detail. In the illustrated embodiment, the brake line anchor 100 has a proximal end 102 and a distal end 104. The brake line anchor 100 generally includes an elongate plate 110 and a line coupling member 120 coupled to the elongate plate 110. In some embodiments, the elongate plate 110 includes a mounting aperture 112 near the proximal end 102, and the line coupling member 120 includes a line securing channel 126 at the distal end 104. In other embodiments, the elongate plate 110 includes any suitable feature at the proximal end 102 for mounting to a component of the vehicle. In further embodiments, the elongate plate 110 is formed using any suitable surface configuration for providing mounting to a component of the vehicle and a coupling to the line coupling member 120.

Figures 7, 8, 9, 10:
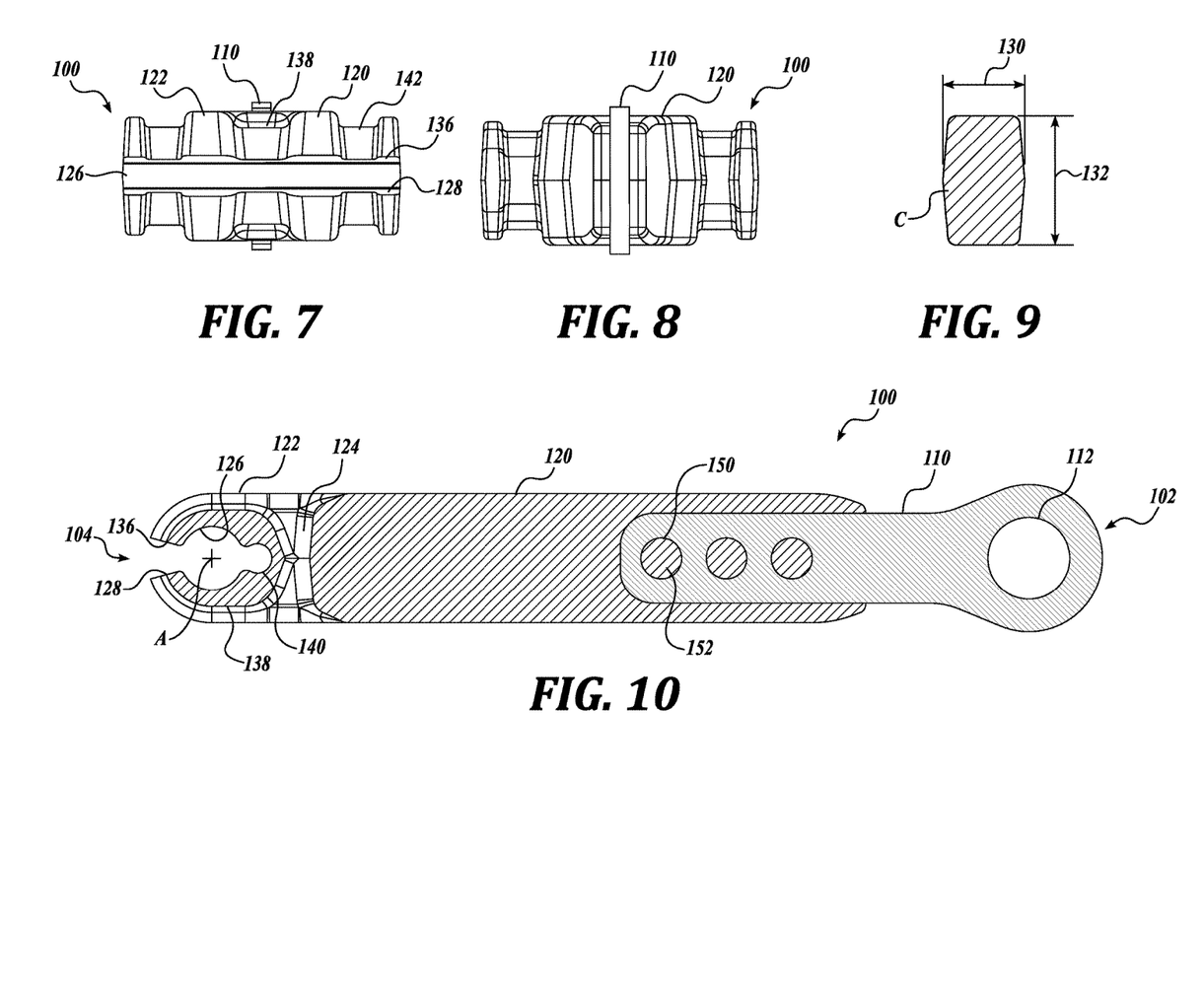
FIG. 7 is a rear elevation view of the line anchor of FIG. 1.
FIG. 8 is a front elevation view of the line anchor of FIG. 1.
FIG. 9 is a cross-sectional slice of the line anchor of FIG. 1, showing the section cut along arrows 9-9 as indicated in FIG. 3.
FIG. 10 is a cross-sectional left elevation view of the line anchor of FIG. 1, showing the section along arrows 10-10 as indicated in FIG. 5.

An intermediate portion of the line coupling member 120 generally includes a first bending thickness 130 and a second bending thickness 132 positioned intermediately along the length of the line coupling member 120. As shown in FIGS. 3-6 and 9, in some embodiments, the first bending thickness 130 and the second bending thickness 132 are positioned separated from the remainder of the body of the line coupling member 120 adjacent to a necked-down shoulder 134, the area of the first and second bending thicknesses 130 and 132 defining a deflection control portion 144 of the line coupling member 120. In these embodiments, the deflection control portion 144 of the line coupling member 120 is necked-down (reduced in cross-sectional area) from the remainder of the body of the line coupling member 120. In this regard, the first and second bending thicknesses 130 and 132 are configured to control the bending stiffness of the brake line anchor 100 between the mounting aperture 112 and a line mounting head 122, as will be described in greater detail below. In certain embodiments, the deflection control portion 144 has a cross-sectional area C, as shown in FIG. 9. The cross-sectional area C is generally dependent on the first bending thickness 130 and the second bending thickness 132.

In some embodiments, at the distal end 104, the line coupling member 120 includes a line mounting head 122 having a securement aperture 124, a securement trough 138, the line securing channel 126, and a line securing extension 142. In the illustrated embodiments, the line mounting head 122 is configured to demountably couple the brake line of the braking system of the vehicle to the brake line anchor 100. In this regard, the line securing channel 126 forms a pocket that interfaces and at least partially surrounds the brake line to provide grip on the brake line. In these embodiments, the brake line is positioned in the line securing channel 126 along an axis A. In embodiments of the present disclosure, the line securing channel 126 is configured to surround any suitable portion along the circumference of the brake line.

Figure 1:
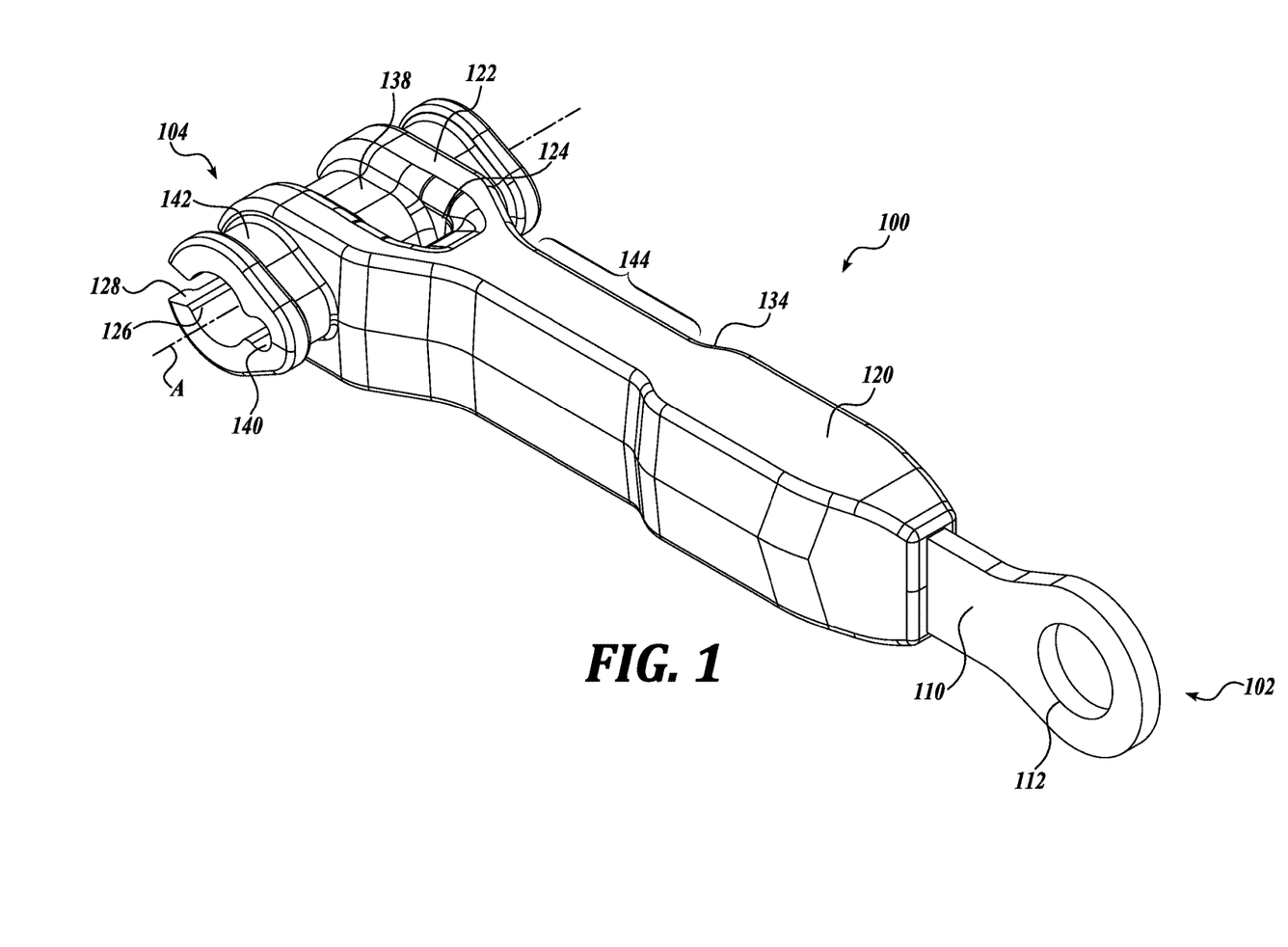
FIG. 1 is a front left top isometric view of one representative embodiment of a line anchor in accordance with an aspect of the present disclosure.
Figure 2:
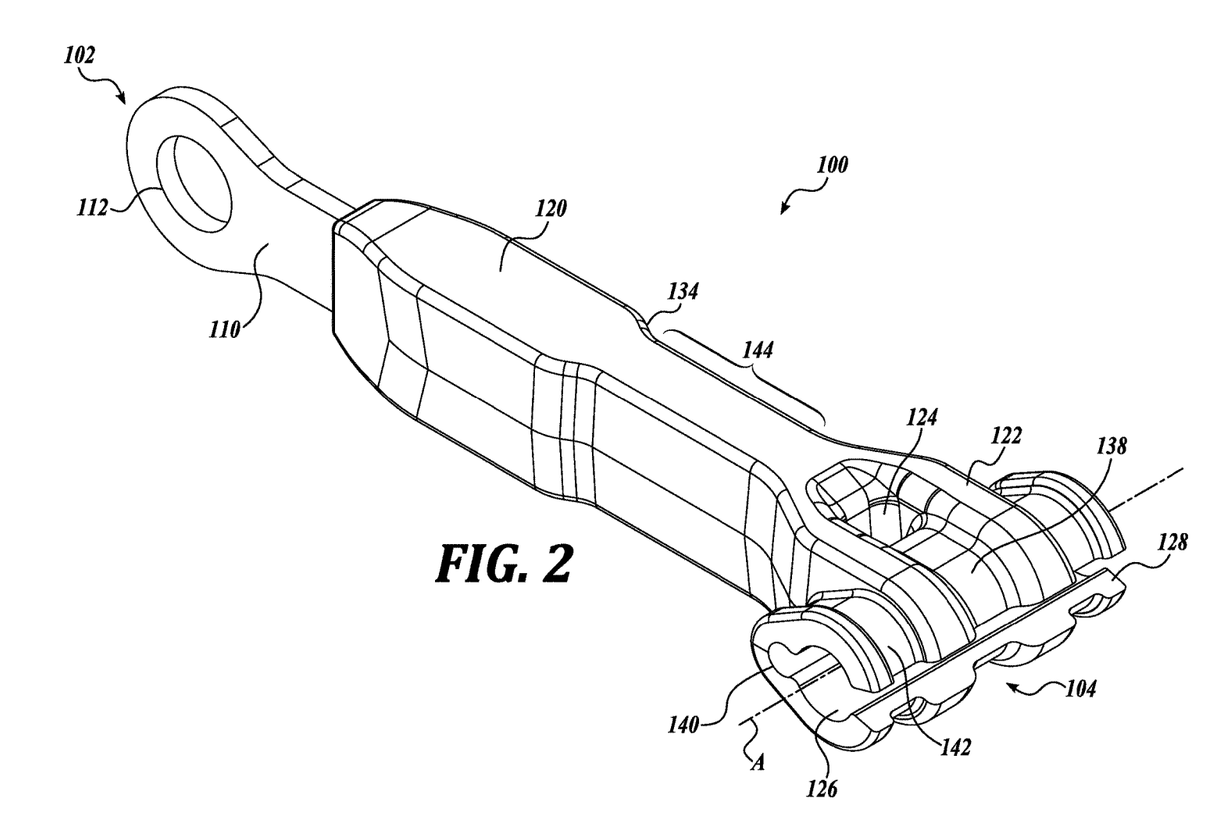
FIG. 2 is a rear right top isometric view of the line anchor of FIG. 1.
Figure 3:
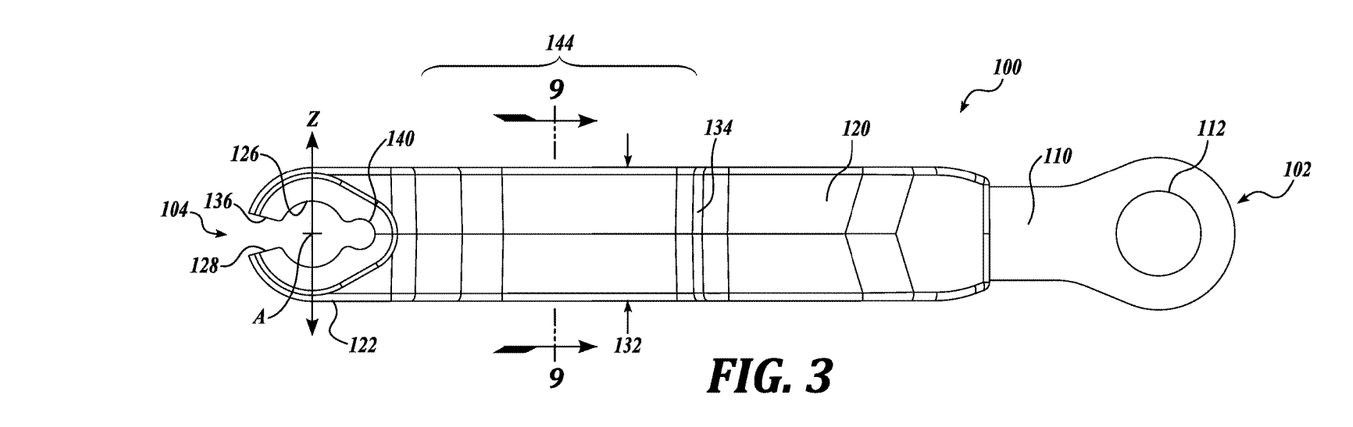
FIG. 3 is a left elevation view of the line anchor of FIG. 1.
Figure 4:
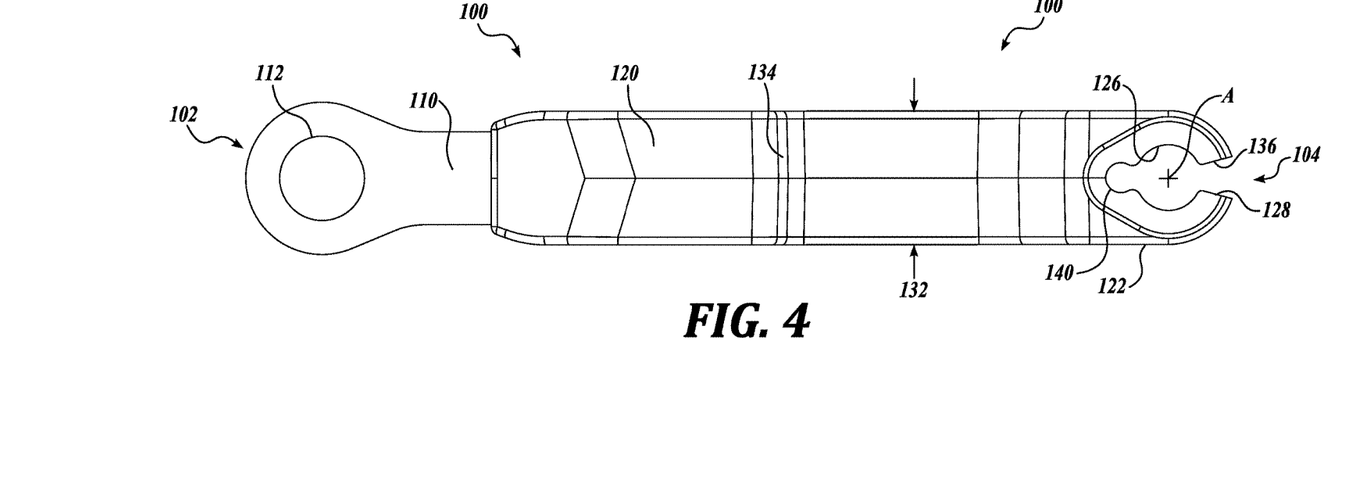
FIG. 4 is a right elevation view of the line anchor of FIG. 1.

As shown in FIGS. 2-4, the line securing channel 126 includes a lower line coupling face 128 and an upper line coupling face 136, which allow the brake line to be seated within the line securing channel 126 without the need to disconnect the brake line from the braking system. In the illustrated embodiment, the lower line coupling face 128 and the upper line coupling face 136 are configured in the form of ramps that center and guide the brake line into the line securing channel 126. In this configuration, as the brake line is inserted into the line securing channel 126, the width of the line securing channel 126 is smaller than the diameter of the brake line such that the insertion causes the lower line coupling face 128 and the upper line coupling face 136 to spread, allowing the brake line to seat within the line securing channel 126, and then retract around the brake line to secure the brake line within the line securing channel 126. In these embodiments, the line coupling head 122 is suitably manufactured from a flexible material that allows the movement of the lower line coupling face 128 with respect to the upper line coupling face 136 during insertion of the brake line, as will be explained in greater detail below.

In some embodiments, the line securing channel 126 includes a relief feature 140 to facilitate the spreading of the lower line coupling face 128 and the upper line coupling face 136. In other embodiments, the line coupling head 122 includes one or more line securing extensions 142 to further interface the brake line and provide increased stability to the line coupling head 122 such that movements of the brake line are transferred to the deflection control portion 144.

In some embodiments, the brake line anchor 100 of the present disclosure is suitable for installation to a vehicle where the brake lines are already installed as a portion of the braking system, such as an installation of the brake line anchor 100 during retrofitting of the suspension system. In other embodiments, the line securing channel 126 is configured to completely surround the brake line in an aperture configuration such that the brake line is inserted through the line securing channel 126 during installation.

When the brake line is seated within the line securing channel 126, in some embodiments, the brake line is further secured by use of the securement aperture 124 and the securement trough 138. In some embodiments, during installation of the brake line anchor 100, a cable tie (not shown), commonly referred to as a zip-tie, is suitably used to secure the brake line to the line mounting head 122. With the brake line seated within the line securing channel 126, a cable tie is routed around the brake line, centered within the securement trough 138, and through the securement aperture 124, whereafter, the cable tie is secured in a loop, preventing escape of the brake line from the line securing channel 126. In certain embodiments, additional cable ties are secured in a loop around the line securing extension 142. In one example, as shown in the illustrated embodiments, three cable ties are suitably used to secure the brake line to the line securing channel 126. In this regard, a first cable tie is routed through the securement aperture 124 and second and third cable ties are routed around the line securing extension on either side of the line coupling head 122. In other embodiments, the brake line is secured to the line mounting head 122 using any suitable mounting scheme, such as with a wire, a clip, a clamp, tape, or the like.

Figure 5:
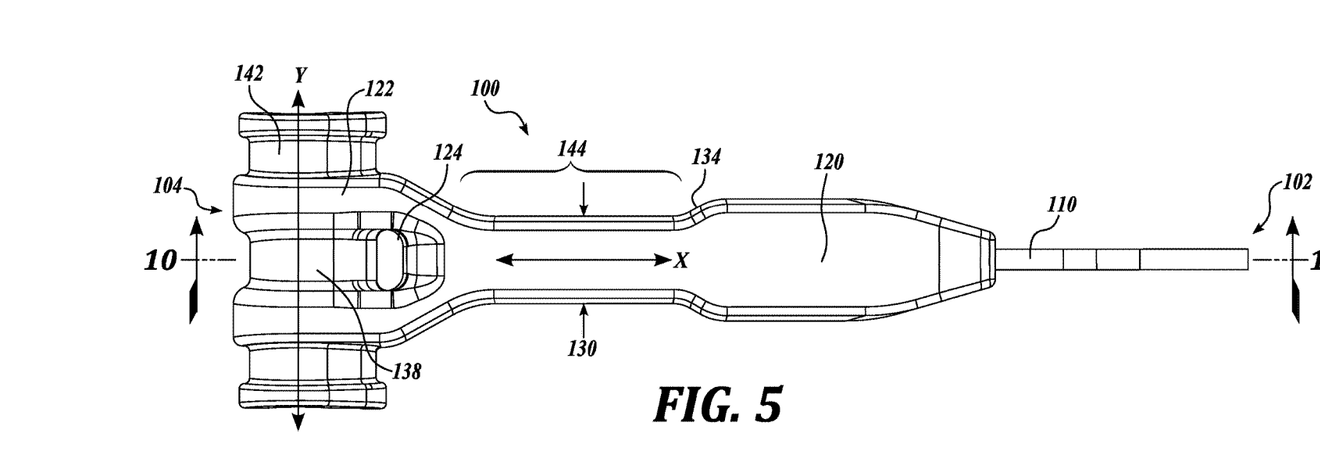
FIG. 5 is a top elevation view of the line anchor of FIG. 1.
Figure 6:
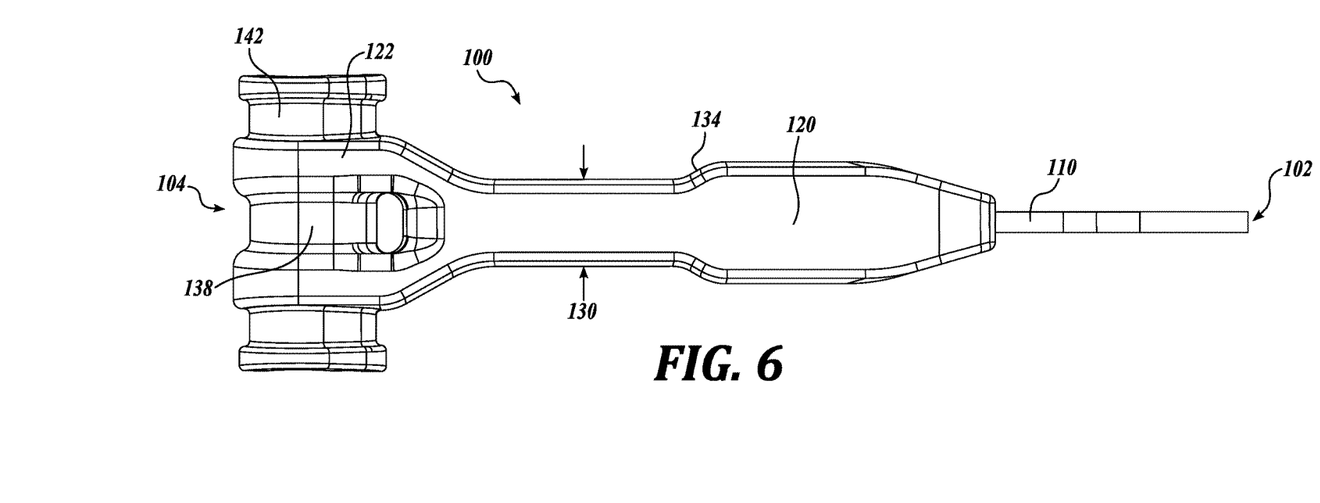
FIG. 6 is a bottom elevation view of the line anchor of FIG. 1.

The coupling of the elongate plate 110 and the line coupling member 120 will now be described in greater detail. Turning to FIG. 10, a cross-sectional view of the brake line anchor 100 is shown along arrows 10-10 as indicated in FIG. 5. In the illustrated embodiment, the elongate plate 110 includes a plurality of traction apertures 150 configured to interface a plurality of corresponding traction protrusions 152. The interface of the traction apertures 150 with the traction protrusions 152 provide a mechanical attachment of the elongate plate 110 and the line coupling member 120 such that the elongate plate 110 does not decouple from the line coupling member 120 during use of the brake line anchor 100. In other embodiments, the elongate plate 110 and the line coupling member 120 are suitably coupled using any mechanical or chemical fastening method, such as with screws, nuts and bolts, deforming features, adhesive, or the like.

In one embodiment, the elongate plate 110 and the line coupling member 120 are formed from a co-molded polymer on metal design. In this configuration, elongate plate 110 is manufactured from a metal to provide a rigid mounting point to the vehicle through the mounting aperture 112. The line coupling member 120 is then manufactured from a polymer in a co-molded configuration, such that during molding, the material of the line coupling member 120 flows through the traction apertures 150, creating the aforementioned mechanical attachment with the elongate plate 110. As described above, in the co-molded embodiment, the polymer material of the line coupling member additionally provides flexibility for the line securing channel 126 to expand during insertion of the brake line. In other embodiments, the elongate plate 110 is manufactured from any suitable material to provide the desired mounting characteristics of the brake line anchor 100, such as steel, stainless steel, aluminum, ferrous metals, non-ferrous metals, composites, laminates, polymers, or other suitable materials.

Likewise, in further embodiments, the line coupling member 120 is manufactured from any suitable material to provide the desired deflection stiffness characteristics of the brake line anchor 100, as will be described in greater detail below. In this regard, the line coupling member 120 is suitably manufactured from natural rubber, synthetic rubber, such as ethylene propylene diene monomer (EPDM), polymers, such as polyurethane, or other elastic materials. In other embodiments, the elongate plate 110 and the line coupling member 120 are manufactured as a single component from any of the materials disclosed herein. In further embodiments, the elongate plate 110 and the line coupling member 120 are manufactured as greater than two components, using the same or any number of materials disclosed herein.

As briefly described above, in embodiments, the brake line anchor 100 is configured to accommodate deflection of the brake line commensurate with the relative movement of the components and provide clearance of the brake line necessary to avoid failure. In this regard, the brake line anchor 100 of the present disclosure is configured to provide independent selection of the stiffness in each direction of bending and in axial compression/extension of the line coupling member 120 such that the brake line anchor 100 is tailored to the mounting location and system in which the brake line anchor 100 is utilized. In embodiments disclosed herein, during deflection, the mounting aperture 112 at the proximal end 102 is fixed in all degrees of freedom relative to the vehicle component to which the brake line anchor 100 is mounted such that no rotation or translation occurs at the mounting aperture 112 when mounted. In other embodiments, any suitable degree of freedom of rotation or translation may be introduced at the mounting aperture 112.

Turning now to FIGS. 3 and 5, as depicted, the brake line anchor 100 includes independent deflection stiffness in X, Y, and Z directions. As described herein, forces applied to the line mounting head 122 by movement of the brake line causes deflection of the line mounting head 122 through the deflection control portion 144 with respect to the pinned coupling at the mounting aperture 112. In general, as shown in FIGS. 3 and 5, deflection of the line mounting head 122 in the X direction will result in compression or extension axially along the length of the line coupling member 120, and deflections of the line mounting head 122 in either the Y or Z directions will result in bending of the line coupling member 120. Exemplary stiffness comparisons between the X, Y, and Z directions will now be described.

In the representative illustrated embodiment, the deflection direction with the greatest stiffness is the X direction as a result of compression/extension along the length of the line coupling member 120, resulting in less movement of the brake line orthogonal to the direction of axis A. The stiffness in the X direction, (the axial stiffness), is in part, a function of the cross-sectional area C and the length of the deflection control portion 144. In one function, the brake line anchor 100 provides a standoff mounting for the brake line. In this regard, the brake line is secured in a spaced apart position from components of the vehicle by the brake line anchor 100, at a distance depending on the length of the brake line anchor 100 between the mounting aperture 112 and the line securing channel 126. In these embodiments, the brake line is spaced apart to protect the brake line from abrading on an object, or from being crushed or pinched between components. In this representative installation configuration, the brake line is suitably spaced from the components during suspension articulation such that the brake line does not contact the components. As a result, the X direction stiffness is relatively high compared to stiffness in other directions such that the brake line does not deflect appreciably in the X direction.

In the representative illustrated embodiment, the deflection direction with the lowest stiffness is the Y direction as a result of bending deflection of the line mounting head 122, resulting in greater movement of the brake line in the direction of axis A. The bending stiffness in the Y direction is controlled, in part, by the first bending thickness 130. As above, the brake line is secured in a spaced apart position from components of the vehicle by the brake line anchor 100, at a distance depending on the length of the brake line anchor 100 between the mounting aperture 112 and the line securing channel 126. The lower relative stiffness in the Y direction allows bending of the brake line anchor 100 in the direction where the most deflection of the brake line at the line mounting head 122 may be necessary. In some embodiments, the bending in the Y direction occurs during the turning of the steer wheels of the vehicle as the brake caliper translates toward and away from the frame of the vehicle. As a result, in some embodiments, the Y direction stiffness is relatively low such that the brake line does not strain or stretch during the turning of the steer wheels.

In the representative illustrated embodiment, the Z deflection direction has a stiffness between that of the X direction and the Y direction. As with the Y direction, the brake line anchor 100 provides stiffness in the Z direction as a result of bending deflection of the line mounting head 122, resulting in intermediate movement of the brake line orthogonal to the direction of axis A. The bending stiffness in the Z direction is controlled, in part, by the second bending thickness 132. As above, the brake line is secured in a spaced apart position from components of the vehicle by the brake line anchor 100, at a distance depending on the length of the brake line anchor 100 between the mounting aperture 112 and the line securing channel 126. The relative stiffness in the Z direction allows bending of the brake line anchor 100 in a direction requiring intermediate deflection of the brake line. In some embodiments, bending of the line mounting head 122 in the Z direction occurs during articulation of the suspension of the vehicle as the brake caliper translates up and down with respect to the frame of the vehicle. As a result, the Z direction stiffness is designed such that the brake line does not strain or stretch during articulation of the suspension.

As described above, in other embodiments, the stiffness of the brake line anchor 100 can be suitably configured in any of the X, Y, and Z directions to accommodate any mounting configuration where relative deflection of the brake line is desired. In such configurations, it may be beneficial to allow greater compliance of the brake line in one direction while limiting compliance in another direction. More specifically, the disclosed brake line anchor 100 can be configured to provide a desired stiffness in each of the X, Y, and Z directions to accommodate suitable deflections for a variety of different operating environments. As such, the foregoing configuration represents one example of the brake line anchor 100; however, line anchors of the present disclosure are capable of securing any hydraulic, pneumatic, or cable line to a component for routing and mounting of the system.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A line anchor, comprising:
    a mounting member having a mounting aperture near a proximal end of the line anchor and a fastening portion opposite the mounting aperture; and
    an elongate coupling member coupled to the fastening portion of the mounting member, the elongate coupling member comprising:
        a line securing channel extending through a distal end of the line anchor, the line securing channel defining an axis and being configured to at least partially surround a line for removably coupling the line to the line anchor; and
        a deflection control portion positioned intermediately along the length of the elongate coupling member, the deflection control portion having a reduced cross sectional area, a first bending stiffness controlled by a first thickness through which the line securing channel deflects in a direction of the axis, and a second bending stiffness controlled by a second thickness through which the line securing channel deflects in a direction orthogonal to the axis.

2. The line anchor of claim 1, wherein the first bending stiffness is less than the second bending stiffness.

3. The line anchor of claim 2, wherein the deflection control portion further comprises a cross-sectional area to control deflection of the elongate coupling member along a longitudinal direction of the elongate coupling member, and wherein the deflection stiffness of the deflection control portion of the elongate coupling member in the longitudinal direction is greater than the second bending stiffness.

4. The line anchor of claim 1, wherein the elongate coupling member further comprises a securement aperture and a securement trough at the distal end for removably coupling the line within the line securing channel.

5. The line anchor of claim 4, wherein the line is further removably couplable to the line securing channel by the securement aperture and the securement trough, together adapted to receive a tie selected from the group consisting of a cable tie, a wire, a clamp, tape, a clip, or a combination thereof.

6. The line anchor of claim 1, wherein the elongate coupling member is sized and configured to surround the mounting member such that the material of the elongate coupling member engages the fastening portion of the mounting member to couple the elongate coupling member thereto.

7. The line anchor of claim 6, wherein the fastening portion includes a plurality of apertures through which the material of the elongate coupling member extends to create a mechanical attachment.

8. The line anchor of claim 1, wherein the elongate coupling member comprises a material selected from the group consisting of natural rubber, synthetic rubber, ethylene propylene diene monomer, polymer, and polyurethane, and the mounting member comprises a material selected from the group consisting of steel, stainless steel, aluminum, ferrous metal, non-ferrous metal, composite, laminate, and polymer.

9. A brake line anchor for removably coupling a brake line to a vehicle, the brake line anchor comprising:
- a vehicle mounting member comprising a mounting aperture, the mounting aperture being configured to secure a proximal end of the brake line anchor to the vehicle; and
- an elongate coupling member coupled to a portion of the vehicle mounting member, the elongate coupling member comprising:
  - a brake line securing channel near a distal end of the brake line anchor, the brake line securing channel defining an axis and being configured to at least partially surround the brake line for removably coupling the brake line to the brake line anchor; and
  - a deflection control portion positioned intermediately along the length of the elongate coupling member, the deflection control portion having a reduced cross sectional area and a first bending stiffness controlled by a first thickness through which the line securing channel deflects in a direction of the axis, and a second bending stiffness controlled by a second thickness through which the line securing channel deflects in a direction orthogonal to the axis, wherein the first bending stiffness is less than the second bending stiffness.

10. The line anchor of claim 9, wherein the deflection control portion further comprises a cross-sectional area to control deflection of the elongate coupling member along a longitudinal direction of the elongate coupling member, and wherein the deflection stiffness of the deflection control portion of the elongate coupling member in the longitudinal direction is greater than the second bending stiffness.

11. The line anchor of claim 9, wherein the elongate coupling member further comprises a securement aperture and a securement trough at the distal end for removably coupling the brake line within the line securing channel.

12. The line anchor of claim 11, wherein the brake line is further removably couplable to the line securing channel by the securement aperture and the securement trough, together adapted to receive a tie selected from the group consisting of a cable tie, a wire, a clamp, tape, a clip, or a combination thereof.

13. The line anchor of claim 9, wherein the elongate coupling member is sized and configured to surround the vehicle mounting member such that the material of the elongate coupling member engages a fastening portion of the vehicle mounting member to couple the elongate coupling member thereto.

14. The line anchor of claim 13, wherein the fastening portion includes a plurality of apertures through which the material of the elongate coupling member extends to create a mechanical attachment.

15. The line anchor of claim 9, wherein the elongate coupling member comprises a material selected from the group consisting of natural rubber, synthetic rubber, ethylene propylene diene monomer, polymer, and polyurethane, and the vehicle mounting member comprises a material selected from the group consisting of steel, stainless steel, aluminum, ferrous metal, non-ferrous metal, composite, laminate, and polymer.

16. A line anchor, comprising:
- a mounting member having a mounting aperture near a proximal end of the line anchor and a fastening portion opposite the mounting aperture; and
- an elongate coupling member coupled to the fastening portion of the mounting member, the elongate coupling member comprising:
  - a line securing channel extending through a distal end of the line anchor, the line securing channel defining an axis and being configured to at least partially surround a line therein;
  - a securement aperture and a securement trough at the distal end for removably coupling the line to the line anchor; and
  - a deflection control portion positioned intermediately along the length of the elongate coupling member, the deflection control portion having a reduced cross sectional area and a first bending stiffness controlled by a first thickness through which the line securing channel deflects in a direction of the axis.

17. The line anchor of claim 16, wherein the deflection control portion further comprises a second bending stiffness controlled by a second thickness through which the line securing channel deflects in a direction orthogonal to the axis, and wherein the first bending stiffness is less than the second bending stiffness.

18. The line anchor of claim 17, wherein the deflection control portion further comprises a cross-sectional area to control deflection of the elongate coupling member along a longitudinal direction of the elongate coupling member, and wherein the deflection stiffness of the deflection control portion of the elongate coupling member in the longitudinal direction is greater than the first bending stiffness.

19. The line anchor of claim 18, wherein the line is further removably couplable to the line securing channel by the securement aperture and the securement trough, together adapted to receive a tie selected from the group consisting of a cable tie, a wire, a clamp, tape, a clip, or a combination thereof.

20. The line anchor of claim 16, wherein the elongate coupling member is sized and configured to surround the mounting member such that the material of the elongate coupling member engages the fastening portion of the mounting member to couple the elongate coupling member thereto.

21. The line anchor of claim 20, wherein the fastening portion includes a plurality of apertures through which the material of the elongate coupling member extends to create a mechanical attachment.

22. The line anchor of claim 16, wherein the elongate coupling member comprises a material selected from the group consisting of natural rubber, synthetic rubber, ethylene propylene diene monomer, polymer, and polyurethane, and wherein the mounting member comprises a material selected from the group consisting of steel, stainless steel, aluminum, ferrous metal, non-ferrous metal, composite, laminate, and polymer.

* * * * *